(12) United States Patent
Graaf et al.

(10) Patent No.: US 10,040,334 B2
(45) Date of Patent: Aug. 7, 2018

(54) R744 BASED HEAT PUMP SYSTEM WITH A WATER COOLED GAS COOLER FOR COOLING, HEATING AND DEHUMIDIFICATION OF AN EV/HEV

(71) Applicant: Halla Visteon Climate Control Corp., Daejeon (KR)

(72) Inventors: Marc Graaf, Krefeld (DE); Navid Durrani, Kerpen (DE); Roberto Della Rovere, Kerpen (DE)

(73) Assignee: HANON SYSTEMS, Daejeon (KR)

( * ) Notice: Subject to any disclaimer, the term of this patent is extended or adjusted under 35 U.S.C. 154(b) by 300 days.

(21) Appl. No.: 14/856,706

(22) Filed: Sep. 17, 2015

(65) Prior Publication Data
US 2016/0082805 A1    Mar. 24, 2016

(30) Foreign Application Priority Data
Sep. 19, 2014  (DE) .................. 10 2014 113 526

(51) Int. Cl.
*B60H 1/00*   (2006.01)
*B60H 1/04*   (2006.01)
(Continued)

(52) U.S. Cl.
CPC ..... *B60H 1/00278* (2013.01); *B60H 1/00328* (2013.01); *B60H 1/00899* (2013.01);
(Continued)

(58) Field of Classification Search
CPC ............ B60H 1/00278; B60H 1/00328; B60H 1/00899; B60H 1/04; B60H 1/14;
(Continued)

(56) References Cited

U.S. PATENT DOCUMENTS 5,524,819 A *  6/1996  Heffner ................. F25B 41/062
                                                    236/92 B
9,822,994 B2 * 11/2017  Yanachi ................. F25B 13/00
(Continued)

FOREIGN PATENT DOCUMENTS

CN        102548780 A     7/2012
EP          2629040 A2    8/2013
(Continued)

*Primary Examiner* — Orlando E Aviles Bosques
*Assistant Examiner* — Joel Attey
(74) *Attorney, Agent, or Firm* — Shumaker, Loop & Kendrick, LLP; James D. Miller (57) ABSTRACT

The invention relates to an air conditioning system for a motor vehicle, with at least two coolant circuits as well as a refrigerant circuit. The refrigerant circuit comprises a compressor for the compression of the refrigerant, a heat exchanger for the cooling and liquefying of the compressed refrigerant, an expansion device, and a heat exchanger for the evaporation of the two-phase refrigerant. The heat exchangers are designed as coolant-refrigerant heat exchangers in each case for the heat transfer between the refrigerant circuit and at least one of the coolant circuits. The refrigerant circuit is moreover constructed with a heat exchanger for the heat exchange between the refrigerant and an air mass flow to be supplied to the passenger compartment of the motor vehicle as well as with an element, arranged downstream of the heat exchanger in the flow direction of the refrigerant, for changing the throughflow cross section.

12 Claims, 3 Drawing Sheets

(51) Int. Cl.
*B60H 1/14* (2006.01)
*B60H 1/32* (2006.01)
(52) U.S. Cl.
CPC ............. *B60H 1/04* (2013.01); *B60H 1/14* (2013.01); *B60H 1/323* (2013.01); *B60H 1/3213* (2013.01); *B60H 1/3227* (2013.01); *B60H 2001/00307* (2013.01); *B60H 2001/00928* (2013.01); *B60H 2001/3289* (2013.01)
(58) Field of Classification Search
CPC .... B60H 1/3213; B60H 1/3227; B60H 1/323; B60H 2001/00307; B60H 2001/00928; B60H 2001/3289
USPC ........................................................ 165/202
See application file for complete search history.

(56) References Cited

U.S. PATENT DOCUMENTS

| | | | |
|---|---|---|---|
| 2003/0200764 A1 | 10/2003 | Takeuchi et al. | |
| 2010/0000713 A1 | 1/2010 | Takahashi et al. | |
| 2012/0174602 A1* | 7/2012 | Olivier | B60H 1/004 62/79 |

FOREIGN PATENT DOCUMENTS

| | | | |
|---|---|---|---|
| JP | 2003320837 A | 11/2003 | |
| JP | 2010012949 A | 1/2010 | |
| JP | 2013500903 A | 1/2013 | |
| WO | 2013023630 A2 | 2/2013 | |

* cited by examiner

R744 BASED HEAT PUMP SYSTEM WITH A WATER COOLED GAS COOLER FOR COOLING, HEATING AND DEHUMIDIFICATION OF AN EV/HEV

CROSS-REFERENCE TO RELATED APPLICATIONS

This application claims priority to German Patent Application No. 10-2014-113526.1 filed on Sep. 19, 2014, the disclosure of which is incorporated herein by reference in its entirety.

FIELD OF THE INVENTION

The invention relates to an air conditioning system for a motor vehicle with at least two coolant circuits as well as a refrigerant circuit. The refrigerant circuit comprises a compressor for compressing the refrigerant, heat exchanger for cooling and liquefying the compressed refrigerant, an expansion device, and a heat exchanger for the evaporation of the two-phase refrigerant. The heat exchangers are designed as coolant-refrigerant heat exchangers in each case for the heat transfer between the refrigerant circuit and at least one of the coolant circuits. The air conditioning system is intended for operation in the chiller mode with the functions of cooling and humidifying as well as in the heating mode for heating or reheating of an air mass flow for a passenger compartment of a motor vehicle constructed with an electrical drive, a combustion-engine drive, or a hybrid drive with an electric motor and a combustion motor.

BACKGROUND OF THE INVENTION

Figure 1:
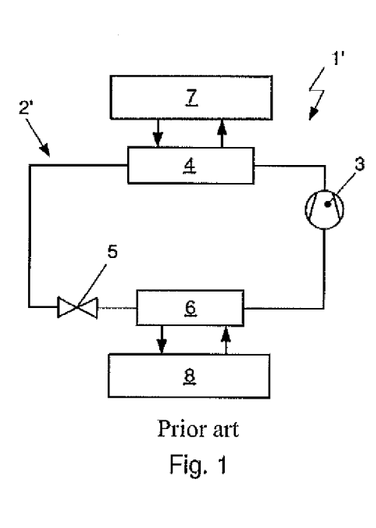
FIG. 1: A flow diagram for an air conditioning system refrigerant circuit according to the prior art.

In FIG. 1, an air conditioning system 1' of a motor vehicle, which is known from the prior art, is represented with a refrigerant circuit 2'. The refrigerant circuit 2' comprises a compressor 3 for compressing the refrigerant, a heat exchanger 4 for cooling and liquefying the compressed gaseous refrigerant at high temperature, an expansion device 5 for lowering the pressure of the refrigerant from a high pressure level to a low pressure level and thus from a high temperature level to a low temperature level, and a heat exchanger 6 for the evaporation and thus for the heat absorption of the two-phase refrigerant present at the lower pressure level and temperature level. The refrigerant which flows, as a vapor, out of the heat exchanger 6, also referred to as evaporator 6, is suctioned by the compressor 3. The refrigerant circuit 2' is closed. The components of the refrigerant circuit 2' are connected to one another via refrigerant lines.

If the liquefaction of the refrigerant occurs in the so-called subcritical operation of the refrigerant circuit 2', as is the case, for example, with the refrigerant R134a, or in certain environmental conditions with the refrigerant R744, which corresponds to the natural refrigerant carbon dioxide, the heat exchanger 4 is referred to as condenser 4. Some of the heat transfer occurs at constant temperature. In the so-called supercritical operation of the refrigerant circuit 2', or in the case of supercritical heat release in the heat exchanger 4, the temperature of the coolant decreases steadily. In this case, the heat exchanger 4 is also referred to as gas cooler 4. A supercritical operation can occur under certain environmental conditions or operating modes of the refrigerant circuit 2', for example, with the refrigerant carbon dioxide.

The heat exchanger 4 of the refrigerant circuit 2' of the air conditioning system 1' in FIG. 1 is designed as a component of a coolant circuit 7 and thus, on the one hand, refrigerant flows through it, and, on the other hand, a first coolant, for example, a water-glycol mixture, flows through it. The heat exchanger 6 is also designed as a component of a coolant circuit 8, and thus in this case as well, on the one hand, a refrigerant is supplied to it, and, on the other hand, a second coolant, for example, a water-glycol mixture, is supplied to it.

With the air conditioning system 1', on the one hand, in the heat exchanger 4 operated as a condenser or gas cooler, a heat transfer between the refrigerant and the first coolant is possible, and, on the other hand, in the heat exchanger 6 operated as an evaporator, a heat transfer between the second coolant and the refrigerant is possible.

In the first coolant circuit 7, the heat transferred in the heat exchanger 4 to the coolant is transported to its destination site, which represents a heat sink. The first coolant circuit 7, which receives the heat of the refrigerant, is operated at a high temperature level of the refrigerant and therefore referred to as a high-temperature coolant circuit. In the second coolant circuit 8, heat is transferred from the environment or from a heat reservoir as heat sink to the coolant. The heat is supplied to the refrigerant in the evaporator 6. The second coolant circuit 8, which releases heat to the refrigerant, is operated at a lower temperature level of the refrigerant and therefore referred to as low-temperature coolant circuit.

The air conditioning system 1' in FIG. 1 can be used as a so-called heating/cooling device, consisting of the refrigerant circuit 2' and the two independent coolant circuits 7, 8, depending on the operating mode, for heating, for cooling or also for combined heating and cooling in the motor vehicle. Here, it is possible, for example, to heat the passenger compartment and at the same time cool the battery or the power electronics. The refrigerant circuit 2' is then operated as a water-water heat pump.

Heating/cooling devices designed in this manner are disclosed, for example, in PCT International Application No. WO 2013/023630 A2, European Published Patent Application No. EP 2 629 040 A2, and Japanese Patent Application JP 2010-012949A.

In WO 2013/023630 A2, the heating/cooling device is described as a compact system, wherein, on the one hand, the compressor and the heat exchanger operated as a gas cooler and, on the other hand, the expansion device and the heat exchanger operated as an evaporator are arranged so that they are in thermal contact with one another in each case. The compressor and the heat exchanger operated as a gas cooler are mutually separated from the expansion device and from the heat exchanger operated as an evaporator by a thermal insulation area.

EP 2 629 040 A2 discloses the heating/cooling device with a coolant-refrigerant heat exchanger, which is arranged within the high-temperature coolant circuit and is designed as a plate heat exchanger. The heat exchanger here comprises different areas for the desuperheating and condensation, for the collection and for the supercooling of the refrigerant.

In the heating/cooling devices known from the prior art, in which a first coolant circuit 7 functions as a heat sink for the refrigerant, the desuperheating heat and the condensation heat of the refrigerant, or the heat to be released by the refrigerant at high-temperature level, is transferred in the liquid-cooled heat exchanger 4 to the coolant and conveyed further by the coolant to a heat sink. Depending on the operating mode, one can consider, for example, the air to be supplied to the passenger compartment or the environmental air to be a heat sink.

In the present principle of indirect heat transfer, the efficiency of the overall system is influenced significantly by the return temperature of the coolant. In a design of the heat exchanger 4 as a counter-current heat exchanger, the refrigerant can be cooled in the ideal case to the input temperature of the coolant entering the heat exchanger 4. As the return temperature of the coolant increases, the output temperature of the refrigerant from the heat exchanger 4 consequently also increases.

In particular, in the operation of the air conditioning system in the heat pump mode, at very low temperatures of the environmental air in the range from −15° C. to −20° C., the goal should be to achieve return temperatures of the coolant in the range from approximately 55° C. to 60° C., in order to be able to condition the passenger compartment to comfortable temperatures in the briefest possible time. In this operation, the refrigerant at the outlet of the heat exchanger 4 would ideally have a temperature of more than 55° C.

However, in order to be able to operate the air conditioning system 1' more efficiently, the refrigerant has to be cooled to temperatures that are much lower than the supply temperature of the coolant.

In the conventional heating/cooling devices, a cooling of the refrigerant to temperatures that are much lower than the supply temperature of the coolant is not possible.

In US 2010/0000713 A1, an air conditioning system for a motor vehicle with a refrigerant circuit and a coolant circuit is disclosed, which are coupled via a heat exchanger for liquefying the refrigerant and thus for the heat release from the refrigerant to the coolant. An inner heat exchanger is located upstream of the heat exchanger in the flow direction of the refrigerant.

Here, inner heat exchanger should be understood to mean a circuit-internal heat exchanger whose function is the heat transfer between the refrigerant at high pressure and the refrigerant at low pressure. In the process, for example, on the one hand, after liquefying, the liquid refrigerant is further cooled or supercooled, and, on the other hand, the refrigerant present in the form of a suction gas is superheated before the inlet of the compressor.

In addition, the air conditioning systems known in the prior art are characterized in that, in the operation in the chiller mode, it takes a very long time to achieve a cooling of the air to be supplied to the passenger compartment via indirect heat transfer from the air to the coolant and subsequently to the refrigerant.

The problem can be solved by providing an air conditioning system with a refrigerant circuit, in which, in the operation in the heat pump mode, additional heat can be discharged from the refrigerant after leaving the heat exchanger operated as a liquefier and used for conditioning the passenger compartment. In addition, in the operation in the chiller mode, the passenger compartment should be cooled in the briefest time possible. It should be possible to operate the air conditioning system with maximum efficiency.

SUMMARY OF THE INVENTION

The problem is solved by an air conditioning system according to the invention for a motor vehicle, with at least two coolant circuits as well as a refrigerant circuit. The refrigerant circuit comprises a compressor for compressing the refrigerant, a heat exchanger for the cooling and liquefying of the compressed refrigerant, an expansion device, and a heat exchanger for the evaporation of the two-phase refrigerant. The heat exchangers are designed as coolant-refrigerant heat exchangers in each case for the heat transfer between the refrigerant circuit and at least one of the coolant circuits.

According to the design of the invention, the refrigerant circuit is constructed with a heat exchanger for the heat transfer between the refrigerant and an air mass flow to be supplied to the passenger compartment of the motor vehicle as well as with an element arranged upstream of the heat exchanger in the flow direction of the refrigerant, for changing the throughflow cross section. The element upstream of the heat exchanger and the heat exchanger are arranged between the heat exchanger for the cooling and liquefying of the compressed refrigerant and the expansion device of the refrigerant circuit.

According to another embodiment of the invention, the heat exchanger for the heat transfer between the refrigerant and the air mass flow to be supplied to the passenger compartment of the motor vehicle is designed so that it can be operated, depending on the demand and the operating mode of the air conditioning system, as an evaporator or as a liquefier. In the operation of the heat exchanger as an evaporator, the air mass flow is cooled and/or dehumidified. In the operation of the heat exchanger as liquefier, the air mass flow is heated.

In the heat exchanger operated as a liquefier, the refrigerant is optionally desuperheated and liquefied, wherein the liquefying is referred to as condensation in the operation of the refrigerant in the subcritical area and as gas cooling in the supercritical area. The heat exchanger is then consequently operated as a condenser or a gas cooler.

The element is advantageously designed so that it can be operated, depending on the operating mode of the air conditioning system and thus the operation of the following heat exchanger, for the heat transfer between the refrigerant and the air mass flow to be supplied to the passenger compartment of the motor vehicle, as an expansion device, in particular as an expansion valve, or with fully opened passage, in particular as a pass valve.

In the operation of the heat exchanger as an evaporator, the element is used as an expansion device, in order to reduce the pressure of the refrigerant to a low pressure level and thus temperature level. In the operation of the heat exchanger as a liquefier, the element is operated with fully opened passage, in order to guide the refrigerant through it at the most equal pressure level possible.

According to an embodiment of the invention, the refrigerant circuit comprises an inner heat exchanger for the heat transfer between the refrigerant at high pressure and the refrigerant at low pressure.

The refrigerant circuit is advantageously constructed with a three-way valve and a bypass path around the inner heat exchanger. Here, the bypass path can be opened or closed by means of the three-way valve. In addition, the opening cross section of the flow through the bypass path and thus the volume of the partial mass flow of the refrigerant which can be guided through the bypass path can be adjusted in a continuously variable manner.

Another embodiment of the invention consists in that the heat exchanger of the refrigerant circuit is designed for the cooling and liquefying of the compressed refrigerant with coolant of a first coolant circuit, and in that the heat exchanger of the refrigerant circuit is designed so that, for the evaporation of the two-phase refrigerant, coolant of a second coolant circuit can flow through it.

The heat exchanger of the refrigerant circuit for the cooling and liquefying the compressed refrigerant is advantageously designed so that coolant of the first coolant circuit and also coolant of the second coolant circuit can flow through it. The supply of the coolants of the different coolant circuits to the heat exchanger occurs as desired depending on the demand and operating mode of the air conditioning system.

According to an embodiment of the invention, the first coolant circuit, in which heat is released from the refrigerant to the coolant, is constructed with a heating heat exchanger. Here, the heat transferred from the refrigerant circuit to the coolant circuit via the heating heat exchanger can be transferred to the air mass flow to be supplied to the passenger compartment of the motor vehicle.

In another embodiment of the invention, the heat exchanger of the refrigerant circuit for the heat transfer between the refrigerant and the air mass flow to be supplied to the passenger compartment of the motor vehicle and the heating heat exchanger of the coolant circuit are arranged in an air channel in such a manner that the air mass flow to be supplied to the passenger compartment flows successively over the heat transfer surfaces of the heat exchanger of the refrigerant circuit and of the heating heat exchanger.

According to a further embodiment of the invention, the heat exchanger of the refrigerant circuit for the heat transfer between the refrigerant and the air mass flow to be supplied to the passenger compartment of the motor vehicle and the heating heat exchanger of the coolant circuit are arranged in two air channels constructed separated from one another in such a manner that the air mass flow to be supplied to the passenger compartment of the motor vehicle flows over the heat transfer surfaces of the heat exchanger of the refrigerant circuit and of the heating heat exchanger in parallel and independently of one another.

According to an embodiment of the invention, the second coolant circuit is constructed with a coolant-air heat exchanger and/or at least one additional heat exchanger, in order to transfer heat from different heat sources to the coolant in the second coolant circuit.

As heat sources, it is possible to use, in addition to environmental air or the air to be supplied to the passenger compartment, for example, electronic components of the drive, the battery, or the motor.

In summary, the air conditioning system according to the invention has various advantages:
a. a refrigerant circuit with three heat exchangers and two expansion valves and thus fewer valves than systems with similar functionality known from the prior art,
b. a lower complexity of the refrigerant circuit due to a lower number of components and thus,
c. lower costs of production and maintenance,
d. in the operation in the chiller mode, the air to be supplied to the passenger compartment can be cooled in a very short time,
e. in the operation in the heat pump mode, additional heat can be dissipated from the refrigerant after leaving the heat exchanger operated as a liquefier and can be used, for example, for conditioning the passenger compartment, and thus,
f. maximum efficiency of the air conditioning system in operation.

BRIEF DESCRIPTION OF THE DRAWINGS

Further details, features and advantages of embodiments of the invention result from the following description of design examples in reference to the associated drawings. Shown are, in each case, an air conditioning system of a motor vehicle with a refrigerant circuit and two coolant circuits acting as heat source or heat sink for the refrigerant circuit.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 2:
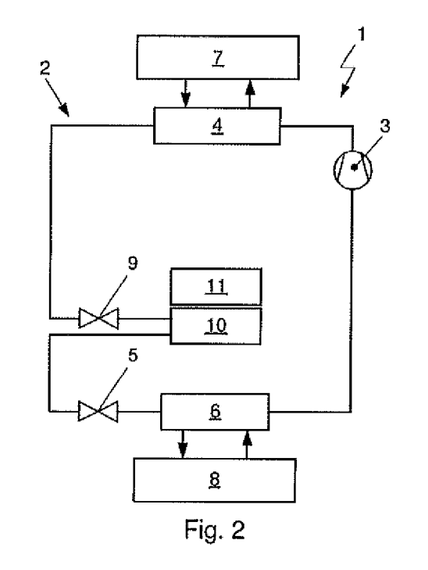
FIG. 2: A flow diagram for an air conditioning refrigerant circuit with a refrigerant-air heat exchanger for the heat transfer between the refrigerant and the air to be supplied to the passenger compartment and an expansion device located in the refrigerant circuit upstream of the heat exchanger in the flow direction of the refrigerant according to an embodiment of the disclosure.

In FIG. 2, an air conditioning system 1 of a motor vehicle, with a refrigerant circuit 2 and two coolant circuits 7, 8 acting as heat source or heat sink for the refrigerant circuit 2, are shown.

The refrigerant circuit 2 comprises, in comparison to the refrigerant circuit 2' of FIG. 1, an additional heat exchanger 10 for the heat transfer between the refrigerant and the air to be supplied to the passenger compartment as well as an element 9 arranged upstream of the heat exchanger 10 in a flow direction of the refrigerant, for changing a throughflow cross section. The heat exchanger 10 is consequently designed as a refrigerant-air heat exchanger.

The air conditioning system 1 comprises, in addition, a heating heat exchanger 11, which is designed for heating the air to be supplied to the passenger compartment. Air can flow through the heating heat exchanger 11 and the heat exchanger 10 to which refrigerant is supplied, in series, that is to say one after the other, or in parallel, that is to say next to one another, and said heat exchangers 10, 11 are arranged in a flow path for guiding the air within a housing.

Identical components to those in the representation of the air conditioning system 1' in FIG. 1 are provided with identical reference numerals.

The heat exchanger 10 designed as a refrigerant-air heat exchanger and the element 9 arranged upstream of the heat exchanger 10 in the flow direction of the refrigerant, for changing the throughflow cross section, are here designed between the heat exchanger 4 operated as a desuperheater and liquefier and the heat exchanger 6 operated as an evaporator or the expansion device 5 arranged upstream of the heat exchanger 6.

The heat exchanger 10 is operated as an evaporator or as a liquefier, depending on the demand and operation of the refrigerant circuit 2. In order to ensure this variable functionality of the heat exchanger 10, the element 9 located upstream in the flow direction of the refrigerant produces, in the operation in the chiller mode, an expansion or throttling of the refrigerant. Advantageously, the element 9 is designed here as an expansion device, in particular as an expansion valve.

In the operation in the heat pump mode, the element 9 produces a passage of the refrigerant without significant pressure losses. The element 9 is switched, in the operation in the heat pump mode, to passage at maximum flow cross section, so that the refrigerant flowing through undergoes no throttling or expansion. Here, the element 9 is advantageously designed as a pass valve.

Consequently, the element 9 can be switched between the function of a throttling device, such as an expansion valve, and a device that does not narrow or only minimally narrows the flow cross section of the refrigerant line, such as an ideal pass valve.

In the operation of the air conditioning system 1 in the heat pump mode, the heat exchanger 10 is operated as an additional air-cooled liquefier, which is arranged downstream of the heat exchanger 4 supplied with the coolant, and which removes additional heat from the refrigerant present at the high pressure level and the high temperature level after leaving the heat exchanger 4. Subsequently, the refrigerant is reduced to the low-pressure level as it flows through the element 5 operated subsequently as an expansion valve. As a result of the additional cooling of the refrigerant flowing out of the heat exchanger 4, on the high-pressure side of the refrigerant circuit 2, the enthalpy of the refrigerant is reduced further, so that, after the pressure reduction on the low-pressure side, a higher specific cooling capacity for the evaporation of the refrigerant is available, which leads to an increase of the efficiency of the operation of the refrigerant circuit in the heat pump mode. With the additional cooling of the refrigerant, it is possible, for example, to preheat suctioned cold outside air, or environmental air or cold circulating air, before the preheated air mass flow is guided further to the heating heat exchanger 11.

The preheating of the air mass flow, in combination with the further cooling of the refrigerant prior to the pressure reduction as it flows through the expansion device 5, leads to a clear increase in the efficiency or the performance coefficient of the refrigerant circuit 2 and thus of the air conditioning system 1.

In the operation of the air conditioning system 1 in the chiller mode, the heat exchanger 10 can be operated as an evaporator, for example, for cooling the air to be supplied to the passenger compartment. In this manner, the air to be supplied to the passenger compartment can be cooled directly via the refrigerant, instead of via the coolant circuit 8. The pressure of the refrigerant is here reduced, as it flows through the element 9 operated as an expansion valve, to the low pressure or to a desired medium pressure.

The heat exchangers 6, 10 can consequently be operated, for the evaporation of the refrigerant, at the same pressure level or at different pressure levels and temperature levels. In the pressure reduction of the refrigerant in element 9 to a medium pressure, the expansion device 5 is used for further pressure reduction from the medium pressure to the lower pressure. In the operation of the heat exchangers 6, 10 at the same pressure level, the expansion device 5 is set to passage, so that the refrigerant flows through with only minimal pressure loss.

Figure 3:
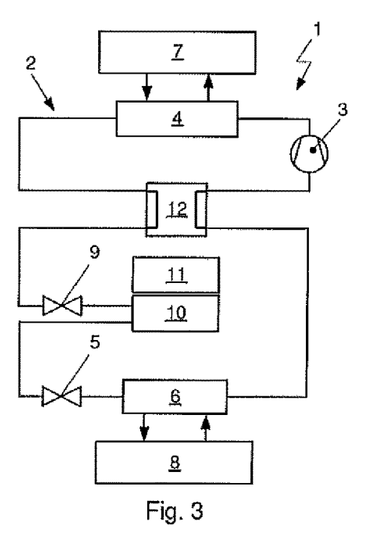
FIG. 3: A flow diagram for an air conditioning refrigerant circuit with an inner heat exchanger according to an another embodiment of the disclosure.

FIG. 3 shows the air conditioning system 1 with, in addition to the refrigerant circuit 2 of FIG. 2, an inner heat exchanger 12, by means of which the efficiency of the air conditioning system 1 can be further increased, particularly in the operation in the chiller mode.

The inner heat exchanger 12 here is a circuit-internal heat exchanger, which is used for the heat transfer between the refrigerant at high pressure and the refrigerant at low pressure. The refrigerant with higher temperature flowing out of the heat exchanger 4 is further cooled or supercooled after the liquefaction in the heat exchanger 4, while, at the same time, the refrigerant flowing out of the evaporator 6 in the form of a suction gas is superheated before the inlet into the compressor 3.

Figure 4:
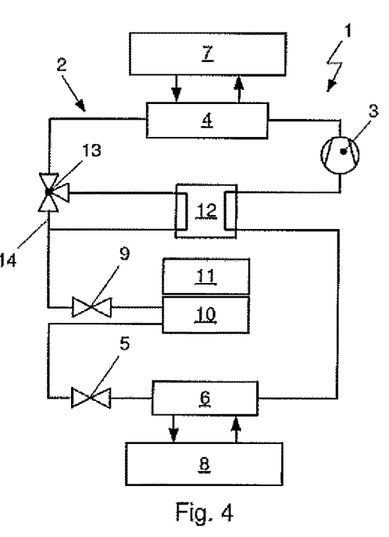
FIG. 4: A flow diagram for an air conditioning refrigerant circuit with a three-way valve and bypass path around an inner heat exchanger on the high-pressure side according to yet another embodiment of the disclosure.

Represented in FIG. 4 are, in addition to the refrigerant circuit of FIG. 3, a three-way valve 13 and a bypass path 14 around the inner heat exchanger 12 on the high-pressure side.

Since the efficiency of the air conditioning system 1 can be increased by the use of the inner heat exchanger 12, in particular in the operation in the chiller mode, but since, on the other hand, the inner heat exchanger 12 can also have a negative effect on the efficiency particularly in the operation in the heat pump mode, depending on the operating parameters, the three-way valve 13 is opened or closed depending on the operating mode and the operating parameters, so that the refrigerant on the high-pressure side flows through the inner heat exchanger 12 or through the bypass 14 past the inner heat exchanger 12, depending on the operating mode.

In this way, for each operation, a variable flow direction of the refrigerant can be set, in order to achieve an optimal efficiency of the air conditioning system 1 both in the operation in the chiller mode and also in the operation in the heat pump mode.

With closed three-way valve 13, the inner heat exchanger 12 is out of operation and refrigerant flows through it only on the low-pressure side. No heat is transferred from the refrigerant at high-pressure level to the refrigerant at low-pressure level.

With the setting of the three-way valve 13 in intermediate position and thus with the mass flow of the refrigerant on the high-pressure side through the inner heat exchanger 12, the heat to be transferred from the refrigerant at high-pressure level to the refrigerant at low-pressure level can be varied, in addition, and adapted to the respective operating conditions.

Figure 5:
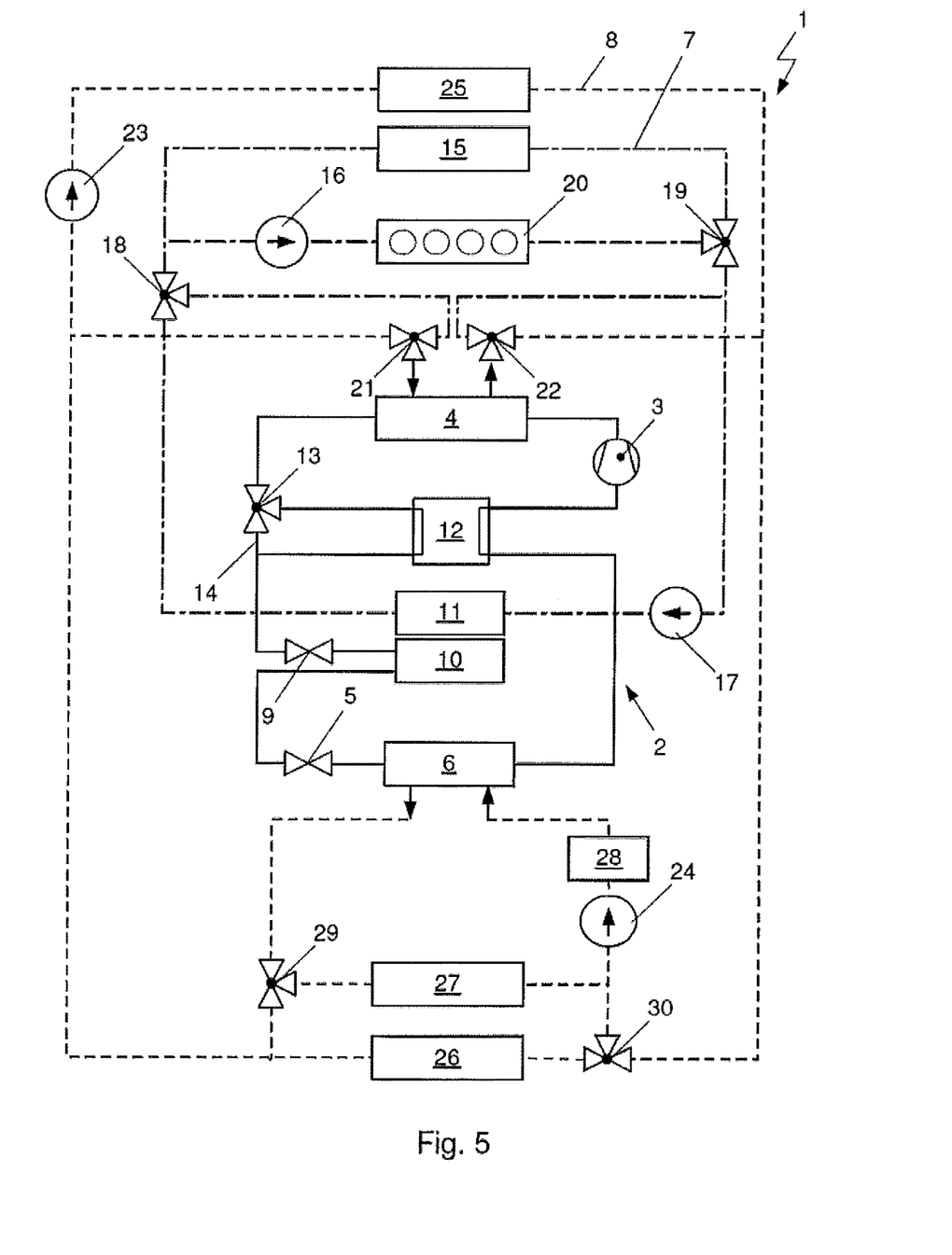
FIG. 5: A flow diagram for the air conditioning refrigerant circuit of FIG. 4 including a detailed illustration of coolant circuits.

In FIG. 5, the air conditioning system 1 with the refrigerant circuit 2 of FIG. 4 and the components of the coolant circuit 7, 8 can be seen.

The coolant circuits 7, 8 comprise, in addition to the heat exchangers 4, 6 coupled to the refrigerant circuit 2, various other heat exchangers 15, 25, 26, 27 as well as pumps 16, 17, 23, 24 and three-way valves 18, 19, 21, 22, 29, 30 for opening and closing the flow paths through the heat exchangers 15, 25, 26, 27. In addition, the coolant circuit 7 is designed for cooling a motor 20, in particular a combustion engine. The motor 20 is also used as heat source of the coolant circuit 7.

The high-temperature cooling circuit 7 is provided substantially for cooling the motor 20 and for providing heat for the refrigerant circuit 2 at high temperature level. The coolant-air heat exchanger 15 is used primarily for releasing the heat absorbed from the motor 20 to the environmental air. Within the high-temperature coolant circuit 7, the heating heat exchanger 11 is moreover integrated, for warming the air to be supplied to the passenger compartment.

In the operation of the air conditioning system 1 in the heat pump mode or in the heating mode, a distinction must be made between different set-ups of the coolant circuit 7.

In the mode where the motor 20 is out of operation, the coolant is conveyed by means of the pump 17 through the heating heat exchanger 11 and the heat exchanger 4. The desuperheating heat and the condensation heat of the refrigerant are transferred in the heat exchanger 4 to the coolant as well as from the coolant in the heating heat exchanger 11 and in the heat exchanger 10 from the refrigerant to the air to be supplied to the passenger compartment.

In the mode with the motor 20 in operation but at a temperature level insufficient for heating the air of the passenger compartment, the desuperheating heat and the condensation heat of the refrigerant are released exclusively in the refrigerant-air heat exchanger 10 to the air to be supplied to the passenger compartment. The coolant is conveyed by means of the pumps 16, 17 through the heating heat exchanger 11 and the motor 20. Here, one of the pumps 16, 17 can be in operation or both pumps 16, 17 can be in operation with adapted capacities, as desired. The air flowing into the passenger compartment is led past the heating heat exchanger 11 in order not to withdraw any heat from the high-temperature coolant circuit 7 and to reach the temperature level required for heating in the briefest time possible.

In addition, the mode with the motor 20 in operation but with a heating capacity that is insufficient for heating the air of the passenger compartment must be distinguished. This case occurs when the temperature level necessary for heating the air to be supplied to the passenger compartment is in fact high enough in the high-temperature coolant circuit 7 but at the same time, due to the efficient operation of the motor 20, the heating capacity available is insufficient for the heating of the passenger compartment. In this mode, the air flowing into the passenger compartment, as it flows over the refrigerant-air heat exchanger 10, is preheated to a required minimum temperature. Subsequently, the preheated air is heated to the desired temperature as it flows over the heating heat exchanger 11.

In the high-temperature coolant circuit 7, in addition to the heating heat exchanger 11 and the coolant-air heat exchanger 15, additional heat exchangers can be connected, which can also be used for adjusting the temperature or for heating components of the vehicle.

In the operation of the air conditioning system 1 in the chiller mode, the desuperheating heat and the condensation heat of the refrigerant are transferred to the low-temperature coolant circuit 8. In the process, the coolant is conveyed by means of the pump 23 and the position of the three-way valves 21, 22 through the heat exchanger 4 and the coolant-air heat exchanger 25, and is released to the environmental air in the coolant-air heat exchanger 25.

The high-temperature coolant circuit 7 is barred with respect to the heat exchanger 4 by means of the three-way valves 21, 22.

Both the high-temperature coolant circuit 7 and also the low-temperature coolant circuit 8 can be connected via the three-way valves 21, 22 to the heat exchanger 4. As a result of the respective position of the three-way valves 21, 22, the heat exchanger 4 can thus be integrated both in the high-temperature coolant circuit 7 and also in the low-temperature coolant circuit 8.

By means of the coolant-air heat exchanger 25 arranged within the low-temperature coolant circuit 8, it is possible, in addition, to use the environmental air as heat source, and the heat absorbed in the coolant-air heat exchanger 25 from the environmental air can be transferred in the heat exchanger 6 to the refrigerant circuit 2. The coolant is conveyed by means of the pump 23 through the coolant-air heat exchanger 25.

In addition, the coolant circuit 8 comprises a heat exchanger 27 designed as a battery cooler and a heat exchanger 26 connected in parallel thereto, for example, for cooling electrical components of the motor vehicle.

The coolant-air heat exchanger 25, the heat exchanger 26 and the battery cooler 27, through which a flow in parallel can occur, can be operated simultaneously or individually, depending on the demand and operating mode of the air conditioning system 1. The function is controlled via the three-way valves 29, 30 and the pumps 23, 24.

As a result, during the operation of the air conditioning system 1 in the chiller mode, in which the desuperheating heat and the condensation heat of the refrigerant are fed via the heat exchanger 4 into the low-temperature coolant circuit 8 and released in the coolant-air heat exchanger 25 to the environmental air, it is possible, at the same time, for example, for the battery to be actively cooled by the battery cooler 27 and for the power electronics to be cooled by the heat exchanger 26. The heat absorbed in the cooling of the battery or the power electronics is transferred via the heat exchanger 6 to the refrigerant circuit 2.

During the operation of the air conditioning system 1 in the heat pump mode as well, it is possible to feed the released heat from the low-temperature coolant circuit 8 into the refrigerant circuit 2 via the heat exchanger 6.

The low-temperature coolant circuit 8 is moreover constructed with a supplemental electric heater 28, for example, a resistance heater, in order to provide, if needed, heat to be transferred to the refrigerant in the heat exchanger 6 and to provide additional heat in case of insufficient heat from the environmental air or the electrical components or the battery and to compensate for a heat shortfall.

The present invention is not limited to the above-mentioned exemplary embodiments, and may be variously applied, and may be variously modified without departing from the gist of the present invention claimed in the claims.

LIST OF REFERENCE NUMERALS

1, 1 Air conditioning system
2, 2' Refrigerant circuit
3 Compressor
4 Heat exchanger, condenser/gas cooler, liquefier
5 Expansion device
6 Heat exchanger, evaporator
7 Coolant circuit high-temperature
8 Coolant circuit low-temperature
9 Element for changing the throughflow cross section
10 Heat exchanger, refrigerant-air heat exchanger
11 Heating heat exchanger
12 Inner heat exchanger
13 Three-way valve of the refrigerant circuit 2
14 Bypass path
15 Coolant-air heat exchanger of the coolant circuit 7
16, 17 Coolant pump of the coolant circuit 7
18, 19 Three-way valve of the coolant circuit 7
20 Motor
21, 22 Three-way valve of the coolant circuit 7, 8
23, 24 Coolant pump of the coolant circuit 8
25 Coolant-air heat exchanger of the coolant circuit 8
26 Heat exchanger for electrical components
27 Heat exchanger, battery cooler
28 Supplemental electric heater
29, 30 Three-way valve of the coolant circuit 8

The invention claimed is:

1. An air conditioning system for a motor vehicle comprising:

a first coolant circuit having a first coolant flowing therethrough;

a second coolant circuit having a second coolant flowing therethrough;

a refrigerant circuit having a refrigerant flowing therethrough, the refrigerant circuit including a compressor configured to compress the refrigerant, a first heat exchanger in fluid communication with the compressor, an expansion device, a second heat exchanger in fluid communication with the expansion device, a third heat exchanger in fluid communication with the second heat exchanger, and an element selectively varying a cross-sectional flow area therein for flow of the refrigerant therethrough, the first heat exchanger in fluid communication with the first coolant circuit and the second coolant circuit, and the second heat exchanger in fluid communication with the second coolant circuit, the third heat exchanger exchanging heat between the refrigerant and a flow of air and disposed intermediate the element and the expansion device;

a first three-way valve configured to selectively provide fluid communication between the first heat exchanger and each of the first coolant circuit and the second coolant circuit, a first fluid line fluidly coupling the first three-way valve to the first coolant circuit, a second fluid line fluidly coupling the first three-way valve to the second coolant circuit, and a third fluid line fluidly coupling the first three-way valve to the first heat exchanger; and a second three-way valve configured to selectively provide fluid communication between the first heat exchanger and each of the first coolant circuit and the second coolant circuit, a fourth fluid line fluidly coupling the second three-way valve to the first coolant circuit, a fifth fluid line fluidly coupling the second three-way valve to the second coolant circuit, and a sixth fluid line fluidly coupling the second three-way valve to the first heat exchanger.

2. The air conditioning system of claim 1, wherein the third heat exchanger is configured as an evaporator in a first operating mode of the air conditioning system and a liquefier in a second operating mode of the air conditioning system.

3. The air conditioning system of claim 2, wherein the element is configured as an expansion device in the first operating mode of the air conditioning system and as a pass valve in the second operating mode of the air conditioning system.

4. The air conditioning system of claim 1, wherein the refrigerant flows through the refrigerant circuit at a high pressure and at a low pressure, and wherein the refrigerant circuit includes an inner heat exchanger receiving the refrigerant at the high pressure and the refrigerant at the low pressure, the inner heat exchanger providing heat transfer between the refrigerant flowing at the high pressure therethrough and the refrigerant flowing at the low pressure therethrough.

5. The air conditioning system of claim 4, wherein the refrigerant circuit includes a third three-way valve and a bypass path, the bypass path bypassing the inner heat exchanger, the third three-way valve in fluid communication with the bypass path and the inner heat exchanger, the third three-way valve selectively opening and closing the bypass path.

6. The air conditioning system of claim 1, wherein the first coolant circuit includes a heating heat exchanger providing heat transfer communication between the first coolant and the flow of air.

7. The air conditioning system of claim 6, wherein the third heat exchanger is disposed adjacent the heating heat exchanger, and wherein the flow of air flows successively through the third heat exchanger and the heating heat exchanger.

8. The air conditioning system of claim 6, wherein the third heat exchanger and the heating heat exchanger are arranged in parallel with respect to the flow of air.

9. The air conditioning system of claim 1, wherein the first coolant circuit includes a motor and a coolant-air heat exchanger.

10. The air conditioning system of claim 1, wherein the second coolant circuit includes a coolant-air heat exchanger, the first three-way valve, and the second three-way valve, the first three-way valve and the second three-way valve in fluid communication with the first coolant circuit.

11. The air conditioning system of claim 1, wherein the second coolant circuit includes a battery cooler and a fourth heat exchanger, the fourth heat exchanger arranged in parallel with respect to the battery cooler.

12. An air conditioning system for a motor vehicle comprising:

a first coolant circuit having a first coolant flowing therethrough and in fluid communication with a motor of the motor vehicle, the first coolant circuit having a heating heat exchanger providing heat transfer communication between the first coolant and a flow of air and;

a second coolant circuit having a second coolant flowing therethrough, the second coolant circuit having a battery cooler, a second coolant circuit heat exchanger, and an electric heater disposed therein, the battery cooler disposed in parallel with the second coolant circuit heat exchanger; and a refrigerant circuit having a refrigerant flowing therethrough, the refrigerant circuit including a compressor configured to compress the refrigerant, a first heat exchanger in fluid communication with the compressor, an expansion device, a second heat exchanger in fluid communication with the expansion device, a third heat exchanger in fluid communication with the second heat exchanger, an inner heat exchanger, and an element selectively varying a cross-sectional flow area therein for flow of the refrigerant therethrough, the first heat exchanger in fluid communication with the first coolant circuit and the second coolant circuit, the second heat exchanger in fluid communication with the second coolant circuit, the third heat exchanger exchanging heat between the refrigerant and the flow of air and disposed intermediate the element and the expansion device, the third heat exchanger disposed adjacent the heating heat exchanger, the inner heat exchanger providing heat transfer between a first flow of the refrigerant and a second flow of the refrigerant;

a first three-way valve configured to selectively provide fluid communication between the first heat exchanger and each of the first coolant circuit and the second coolant circuit, a first fluid line fluidly coupling the first three-way valve to the first coolant circuit, a second fluid line fluidly coupling the first three-way valve to the second coolant circuit, and a third fluid line fluidly coupling the first three-way valve to the first heat exchanger; and a second three-way valve configured to selectively provide fluid communication between the first heat exchanger and each of the first coolant circuit and the second coolant circuit, a fourth fluid line fluidly coupling the second three-way valve to the first coolant circuit, a fifth fluid line fluidly coupling the second three-way valve to the second coolant circuit, and a sixth fluid line fluidly coupling the second three-way valve to the first heat exchanger.

* * * * *